(12) United States Patent
Balakrishnan et al.

(10) Patent No.: US 9,740,413 B1
(45) Date of Patent: Aug. 22, 2017

(54) MIGRATING DATA USING MULTIPLE ASSETS

(71) Applicant: EMC Corporation, Hopkinton, MA (US)

(72) Inventors: Ajith Balakrishnan, Bangalore (IN); Brad Bowlin, Fort Collins, CO (US); Felix Shvaiger, Netanya (IL); Alexandr Veprinsky, Brookline, MA (US); Arieh Don, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 44 days.

(21) Appl. No.: 14/672,347

(22) Filed: Mar. 30, 2015

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC ............ *G06F 3/0619* (2013.01); *G06F 3/065* (2013.01); *G06F 3/0656* (2013.01); *G06F 3/0665* (2013.01); *G06F 3/0689* (2013.01); G06F 2003/0692 (2013.01)

(58) Field of Classification Search
CPC ........... G06F 2009/4557; G06F 3/0647; G06F 9/45558; G06F 9/5077
USPC ........................................................ 711/114
See application file for complete search history.

(56) References Cited

U.S. PATENT DOCUMENTS

| | | | | |
|---|---|---|---|---|
| 6,269,382 B1* | 7/2001 | Cabrera | ............ | G06F 17/30082 |
| 8,949,208 B1* | 2/2015 | Xu et al. | ................ | G06F 3/0641 |
| | | | | 707/661 |
| 9,058,119 B1* | 6/2015 | Ray, III | .................. | G06F 3/061 |
| 9,250,823 B1* | 2/2016 | Kamat | .................. | G06F 3/0647 |
| 2002/0069280 A1* | 6/2002 | Bolik | ................ | G06F 17/30067 |
| | | | | 709/225 |
| 2009/0064167 A1* | 3/2009 | Arimilli | .................. | G06F 9/522 |
| | | | | 718/105 |
| 2009/0125678 A1* | 5/2009 | Tokuda | ................. | G06F 3/0611 |
| | | | | 711/114 |
| 2009/0150639 A1* | 6/2009 | Ohata | ................... | G06F 3/0608 |
| | | | | 711/172 |
| 2011/0060885 A1* | 3/2011 | Satoyama | ............. | G06F 3/0605 |
| | | | | 711/170 |
| 2011/0145197 A1* | 6/2011 | Kamohara | ........ | G06F 17/30286 |
| | | | | 707/647 |
| 2011/0202640 A1* | 8/2011 | Pillutla | ................. | G06F 9/5077 |
| | | | | 709/221 |
| 2011/0246740 A1* | 10/2011 | Yata | ...................... | G06F 3/0611 |
| | | | | 711/165 |
| 2013/0041977 A1* | 2/2013 | Wakamiya | ............ | G06F 9/5077 |
| | | | | 709/217 |

(Continued)

*Primary Examiner* — Sheng-Jen Tsai
(74) *Attorney, Agent, or Firm* — Daly, Crowley, Mofford & Durkee, LLP

(57) ABSTRACT

In one aspect, a method includes migrating a first device on a first array to a second device on a second storage array. The migrating includes instructing an asset to scan the first array and the second array for the first device and the second device, reading a work buffer on the second array, sending a request to the work buffer for a chunk of the first device to copy to the second device, reading assigned chunk from the first device, copying the assigned chunk to the second device and notifying the work buffer that the copying of the assigned chunk was successful.

20 Claims, 6 Drawing Sheets

(56) References Cited

U.S. PATENT DOCUMENTS

| | | | |
|---|---|---|---|
| 2014/0019974 A1* | 1/2014 | Siu | G06F 9/4856 718/1 |
| 2014/0108475 A1* | 4/2014 | Yamada | G06F 17/30079 707/829 |
| 2015/0236977 A1* | 8/2015 | Terayama | H04L 47/762 709/224 |

* cited by examiner

MIGRATING DATA USING MULTIPLE ASSETS

BACKGROUND

Computer data is vital to today's organizations and a significant part of protection against disasters is focused on data protection. As solid-state memory has advanced to the point where cost of storage has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes migrating a first device on a first array to a second device on a second storage array. The migrating includes instructing an asset to scan the first array and the second array for the first device and the second device, reading a work buffer on the second array, sending a request to the work buffer for a chunk of the first device to copy to the second device, reading assigned chunk from the first device, copying the assigned chunk to the second device and notifying the work buffer that the copying of the assigned chunk was successful.

In another aspect, an apparatus, includes electronic hardware circuitry configured to migrate a first device on a first array to a second device on a second storage array. The circuitry configured to migrate the first device on the first array to the second device on the second storage array includes circuitry configured to instruct an asset to scan the first array and the second array for the first device and the second device, read a work buffer on the second array, send a request to the work buffer for a chunk of the first device to copy to the second device, read assigned chunk from the first device, copy the assigned chunk to the second device and notify the work buffer that the copying of the assigned chunk was successful.

In a further example, an article includes a non-transitory computer-readable medium that stores computer-executable instructions to migrate a first device on a first array to a second device on a second storage array. The instructions cause a machine to instruct assets to scan the first array and the second array for the first device and the second device, read a work buffer on the second array, send a request to the work buffer for a chunk of the first device to copy to the second device, read assigned chunk from the first device, copy the assigned chunk to the second device and notify the work buffer that the copying of the assigned chunk was successful.

DETAILED DESCRIPTION

Described herein are techniques to migrate data from one device to another device using multiple assets. In particular, instead of having one asset involved in the migration, other assets having bandwidth also contribute to the migration. As will be also described herein the selection of assets may be based on machine learning (e.g., based on the performance of each asset). While the description herein describes migrating one device to another device using multiple hosts, one of ordinary skill in the art can apply these techniques to other assets such as storage arrays, virtual hosts, virtual storage (e.g., EMC® VPLEX®), and so forth.

Figure 1:
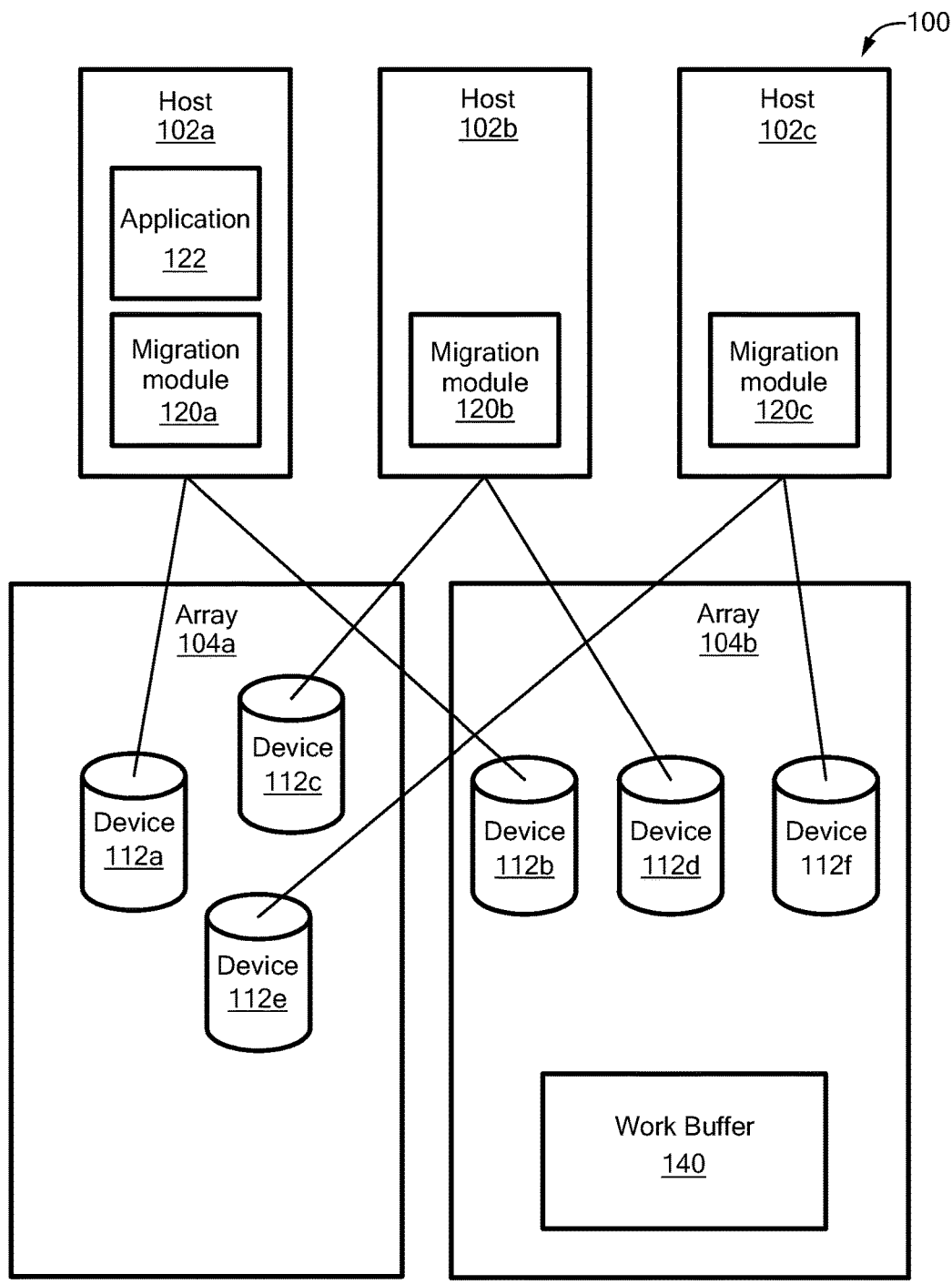
FIG. 1 is a block diagram of an example of a system to migrate data from one device to another device.

Referring to FIG. 1, a system 100 includes hosts 102*a*-102*c* and arrays 104*a*, 104*b*. Each of the hosts 102*a*-102*c* includes a respective migration module 120*a*-120*c*, each configured to migrate a device to another device. The host 102*a* also includes an application 122. The array 104*a* includes storage devices 112*a*, 112*c*, 112*e* and the array 104*b* includes storage devices 112*b*, 112*d*, 112*f* and a work buffer 140.

The host 102*a* is configured to see the device 112*a* and the device 112*b* but not see (e.g., have no knowledge) the devices 112*c*-112*f*. The host 102*b* is configured to see the devices 112*c* and the device 112*d* but not the devices 112*a*, 112*b*, 112*e*, 112*f*. The host 102*c* is configured to see the device 112*e* and the device 112*f* but not the devices 112*a*-112*d*.

As will be described further herein the migration modules 120*a*-120*c* will be configured to assist in the migration of data from one device to another device using hosts that initially do not see either device. For example, this description will focus on an example migration of the device 112*a* to the device 112*b*. Devices 112*a*, 112*b* are not seen by the hosts 102*b*, 102*c* (even though hosts 102*b*, 102*c* can see other devices on the array 104*a*, 104*b*), yet the techniques described herein will enable hosts 102*b*, 102*c* to assist in the migration. One of ordinary skill in the art would recognize that even though device 112*a* is on storage array 104*a* and the migration target, device 112*b* is on a storage array 104*b*, the techniques described will work even if the devices (e.g., 112*a*, 112*b*) are located on the same storage array.

Figure 2:
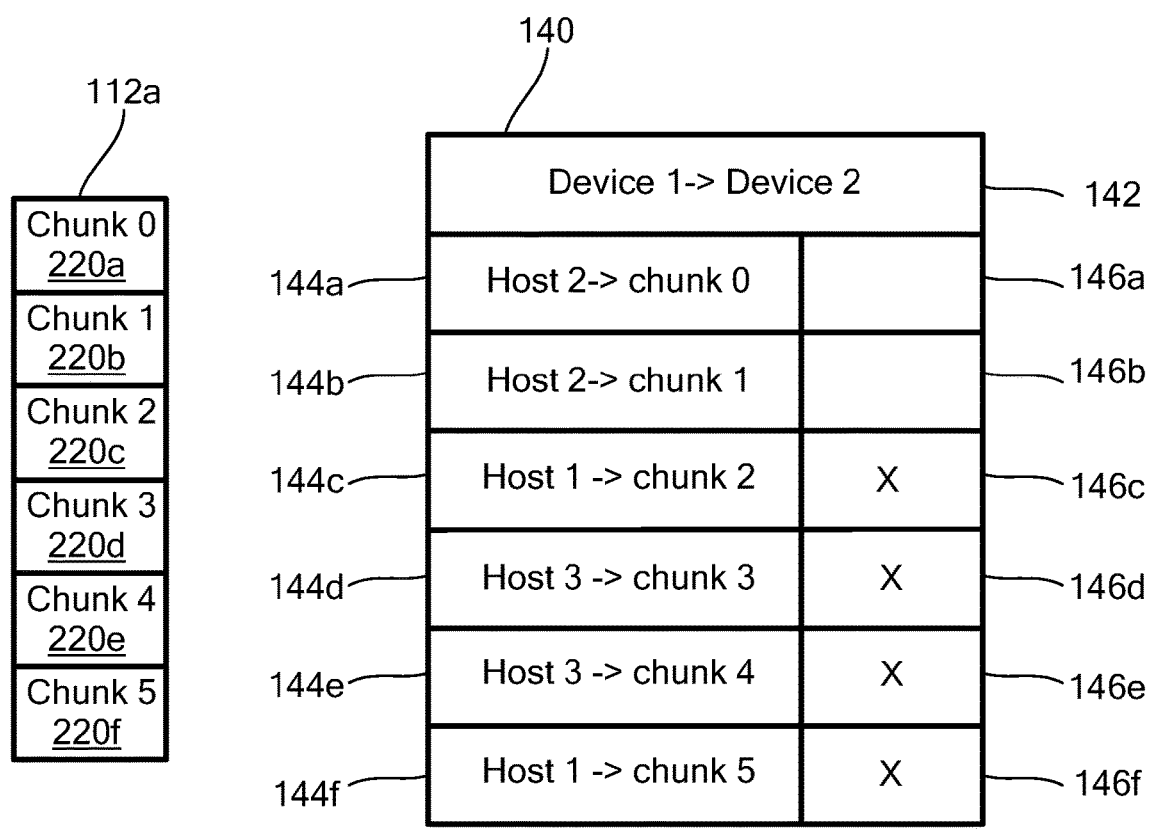
FIG. 2 is an illustration of an example of storage device to migrate and an example, of a work buffer used to migrate the storage device.

Referring to FIG. 2, as will be shown further herein the work buffer 140 will be used. In one example, the work buffer 140 is placed on the storage array of the target device (e.g., device 112*b*) which is storage array 104*b*.

The work buffer 140 includes a migration field 142 which indicates that device 1 is being migrated to device 2. The work buffer 140 also includes asset-chunk fields (e.g., asset-chunk fields 144*a*-144*f*) indicating which chunks of device 1 are being moved by an asset. For example, the device 112*a* may be divided into chucks (of storage) (e.g., chunk 0 220*a*, chunk 1 220*b*, chunk 2 220*c*, chunk 3 220*d*, chunk 4 220*e* and chunk 5 220*f*). In this particular example, the asset-chunk field 144a indicates that host 2 will move chunk 0 220a, the asset-chunk field 144b indicates that host 2 will move chunk 1 220b, the asset-chunk field 144c indicates that host 1 will move chunk 2 220c, the asset-chunk field 144d indicates that host 3 will move chunk 3 220d, the asset-chunk field 144e indicates that host 3 will move chunk 4 220e and the asset-chunk field 144f indicates that host 1 will move chunk 5 220f.

Each asset-chunk field 144a-144f has a corresponding success field 146a-146f respectively. If the migration of a chunk is successful then the corresponding success field 146a-146f will indicate successful transfer (e.g., as shown by the "X" in FIG. 2). For example, the success field 146c is marked with an "X" to indicate that the transfer of chunk 2 by host 1 was successful, the success field 146d is marked with an "X" to indicate that the transfer of chunk 3 by host 3 was successful, the success field 146e is marked with an "X" to indicate that the transfer of chunk 4 by host 3 was successful and the success field 146f is marked with an "X" to indicate that the transfer of chunk 5 by host 1 was successful.

Figure 3:
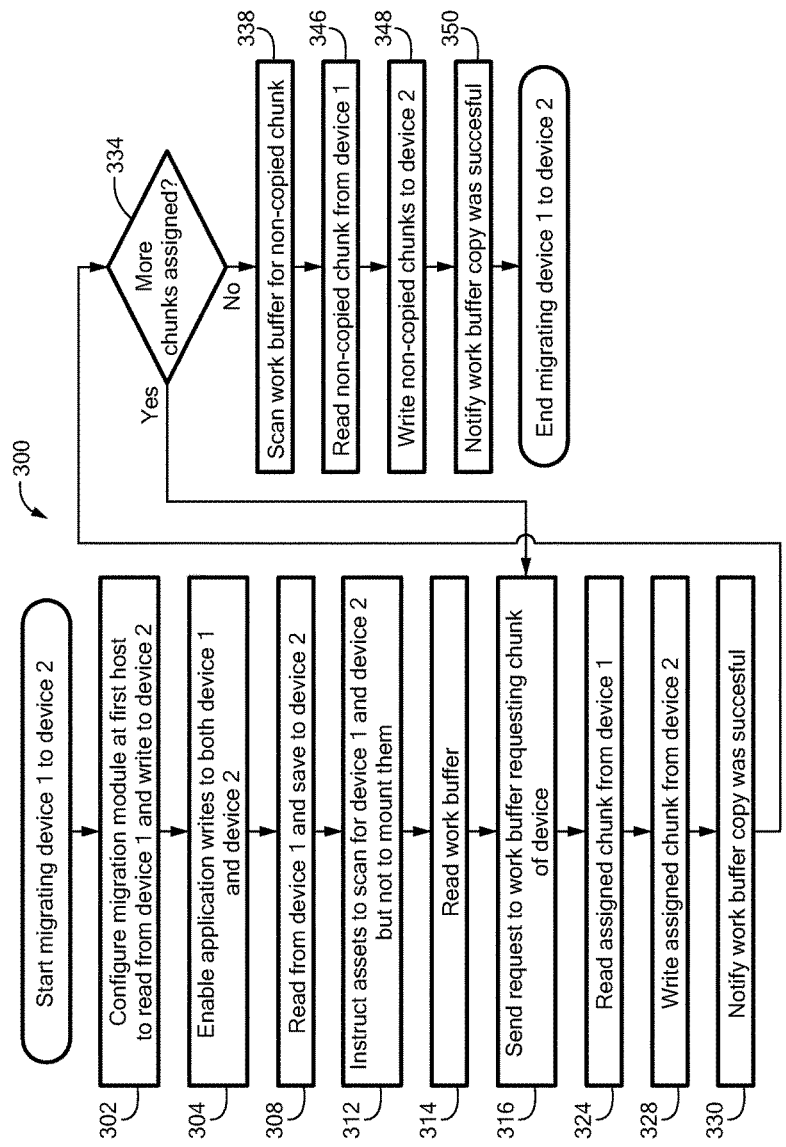
FIG. 3 is a flowchart of an example of a process to migrate a device.

Referring to FIG. 3, a process 300 is an example of a process to migrate a device (e.g., migrating the device 112a to the device 112b). Process 300 configures migration module at first host to read from device 1 and write to device 2 (302). For example, the first host, in this example, is the host 102a. The migration module 120a is configured to read from the device 112a and to write to the device 112b.

Process 300 enables application writes to both device 1 and device 2. For example, the application 122 may still write to the device 112a, but the migration module 120a will also intercept the writes from the application 122 to device 112a and write them to the device 112b.

Process 300 reads from device 1 and saves to device 2 (308). For example, the migration module 120a reads from the device 112a and writes to the device 112b.

Process 300 instructs assets to scan for device 1 and device 2, but not to mount device 1 and device 2 (312). For example, the migration module 120b and the migration module 120c are instructed to scan the arrays 104a, 104b for the devices 112a, 112b, but not to mount (access) the devices 112a, 112b. In one example, processing block 312 is initiated by a user. In another example, processing block 312 is initiated by the array 104b when the migration is started by the migration module 120a.

Process 300 reads work buffer (314). For example, the migration modules 120b, 120c read the work buffer 140. The migration modules 120b, 120c are able to access the work buffer 140 after the devices 112a, 112b can be seen. By reading the work buffer 140, the hosts 102b, 102c read the field 142 and recognize that the host 102a need help in the migration of device 112a to device 112b.

Process 300 sends requests to work buffer requesting a chunk of device 1 (316). For example, the hosts 102b, 102c (e.g., using migration modules 120b, 120c, respectively) send a SCSI command to the work buffer 114 asking for a chunk of device 112a to copy to the device 112b.

Process 300 reads assigned chunk from device 1 (324) and writes assigned chunk to the device 2 (328). For example, hosts 102b, 102c (e.g., using migration modules 120b, 120c, respectively) read the assigned chunk from the device 112a and writes the assigned chunk to the device 112b.

Process 300 notifies work buffer copy was successful (330). For example, hosts 102b, 102c (e.g., using migration modules 120b, 120c, respectively) notify the work buffer 140 that the assigned chunk was written successfully to the device 112b. A field in column 146 of the work buffer is changed to get the successful transfer of the assigned chunk to the device 112b.

Process 300 determines if there are more chunks assigned (334) and if more chunks are assigned repeats processing blocks 316, 324, 328, 330 and 334.

If there are no more chunks to assign, process 300 scans work buffer for non-copied chunks (338). For example, if host 102b crashes before it can complete the transfer of its assigned chunk to the device 112b. This failed assigned chunk is a non-copied chunk. The remaining host 102c (e.g., using migration module 120c) reads the work buffer 140 for fields in the column 146 that have not been annotated to indicate that a chunk has been successfully transferred to the device 112b.

Process 300 reads non-copied chunks from device 1 (346), writes the non-copied chunks to device 2 (348) and notifies work buffer that non-copied chunks were copied on to device 2 (350). For example, the remaining host reads the non-copied chunk from the device 112a, writes the non-copied chunk to the device 112b and notifies the work buffer 140 that the non-copied chunk has been successfully delivered to the device 112b.

Figure 4:
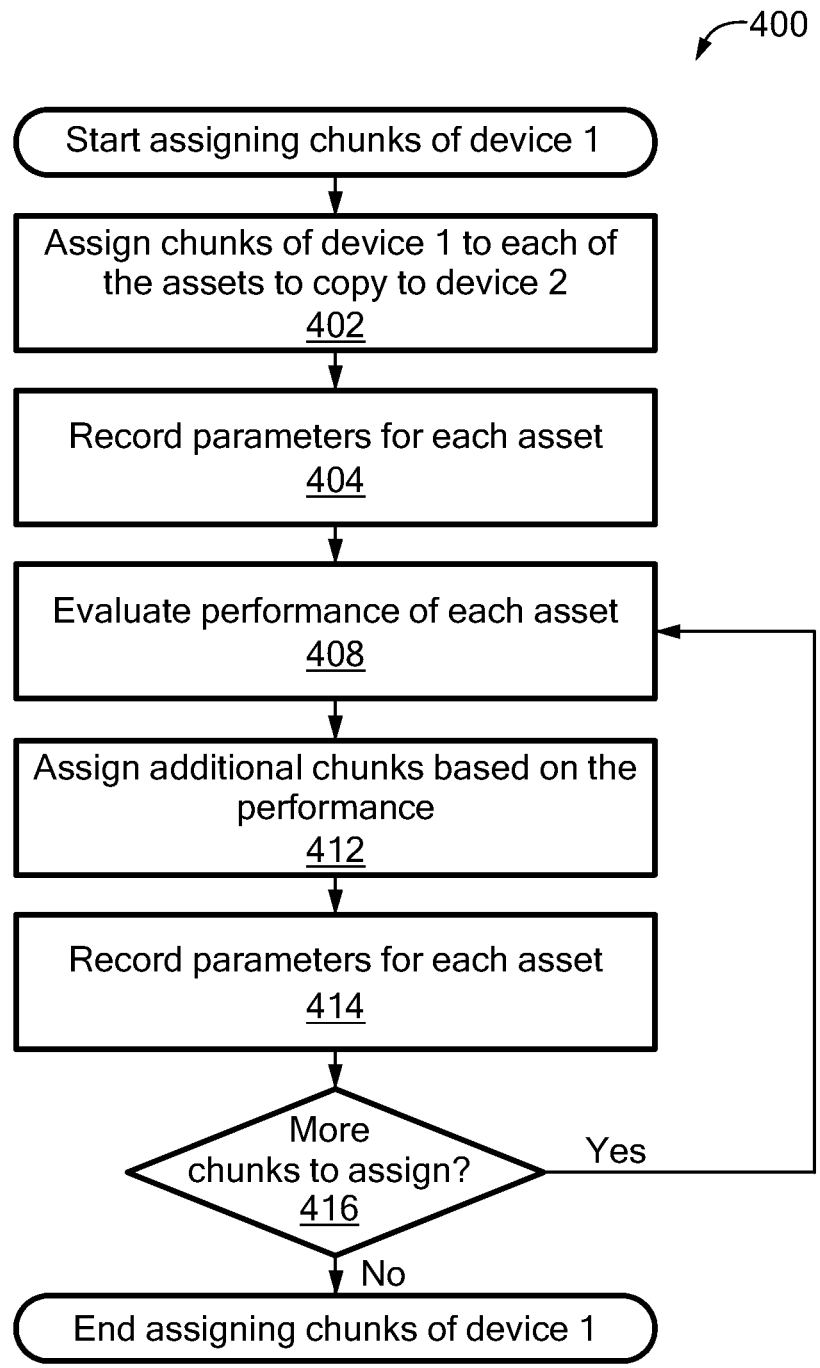
FIG. 4 is a flowchart of an example of a process to assign assets for migration based on asset performance.
Figure 5:
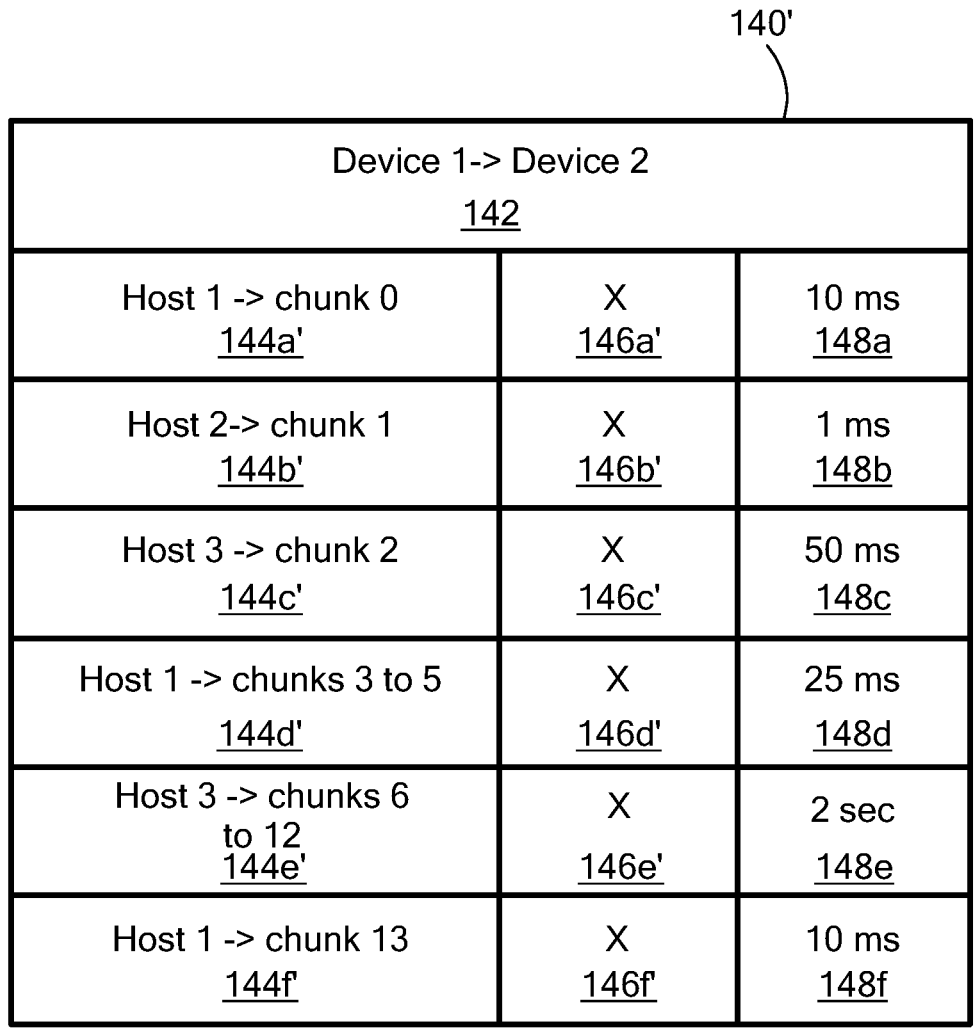
FIG. 5 is an illustration of another example of a work buffer used to migrate the storage device that records asset performance.

Referring to FIGS. 4 and 5, a process 400 is an example of a process to assign assets for migration of device 1 to device 2 based on asset performance. In one example, if device 112a is being migrated to device 112b, then the migration module 120a of the host 102a that sees both devices performs process 400. As shown in FIG. 2, the asset-chunk fields 144a-144f of the work buffer 140 are completely prefilled, for example, by the migration module 120. As will be further described herein in conjunction with FIGS. 4 and 5, the asset-chunk fields may be partially prefilled while the remaining asset-chunk fields are filled in based on the performance of the assets during migration.

Process 400 assigns chunks of device 1 to each of the assets to copy to device 2 (402) and records parameters for each asset (404). For example, a work buffer 140' assigns host 102a chunk 0 (as indicated in an asset-chunk field 144a' of the work buffer 140'), host 102b chunk 1 (as indicated in an asset-chunk field 144b' of the work buffer 140') and host 102c chunk 2 (as indicated in an asset-chunk field 144c' of the work buffer 140') to copy from the device 112a to the device 112b. The work buffer 140' indicates that the copying of chunks 0, 1, 2 is successful as indicated in fields 146a'-146c' respectively. The work buffer 140' also records how long it took each asset to copy their respective chunk to device 112b. For example, it took host 102a 10 milliseconds (as indicated in a time field 148a of the work buffer 140'), host 102b 1 millisecond (as indicated in a time field 148b of the work buffer 140') and host 102c 50 milliseconds (as indicated in a time field 148c of the work buffer 140').

Process 400 evaluates performance of each asset (408) and assigns additional chunks of device 1 to copy based on the performance (412). Since host 102c performed the slowest (50 milliseconds), host 102c will be assigned less chunks than the other hosts 102a, 102b and since host 102b performed the fastest (1 millisecond) host 102b will be assigned more chunks than the other host 102a, 102c. In this example, host 102a will copy chunks 3 to 5 (three chunks) (as indicated in an asset-chunk field 144d' of the work buffer 140'), host 102b will copy chunks 6 to 12 (7 chunks) (as indicated in an asset-chunk field 144e' of the work buffer 140') and host 102c will copy chunk 13 (1 chunk) (as indicated in an asset-chunk field 144f' of the work buffer 140').

Process 400 records parameters for each asset (414). For example, the work buffer 140' indicates that the copying of chunks 3 to 5, 6 to 12 and 13 is successful as indicated in fields 146d'-146f', respectively. The work buffer 140 records how long it took each host to copy their respective chunk to device 112b. In this particular example, it took host 102a 25 milliseconds to copy three chunks (as indicated in a time field 148d of the work buffer 140'), host 102b 2 seconds to copy seven chunks (as indicated in a time field 148e of the work buffer 140') and host 102c 10 milliseconds to copy one chunk 13 (as indicated in a time field 148f of the work buffer 140') from device 112a to device 112b.

Process 400 determines if there are more chunks of device to assign (416) and if there are more chunks of device 1 to assign repeats processing blocks 408, 412, 414 and 416. If there are no chunks of device 1 left to assign, process 400 ends.

Figure 6:
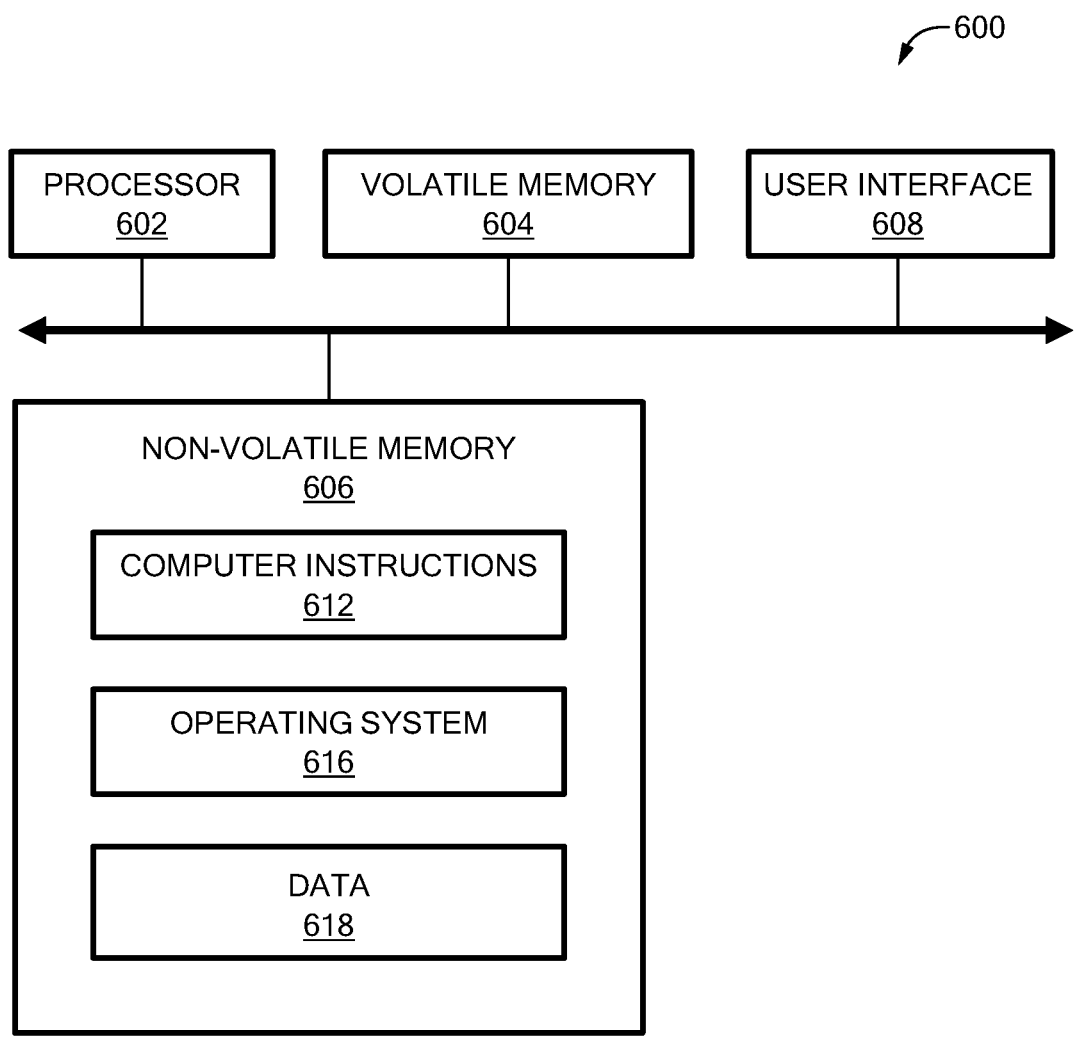
FIG. 6 is a computer on which any of the processes of FIGS. 3 and 4 may be implemented.

Referring to FIG. 6, in one example, a computer 600 includes a processor 602, a volatile memory 604, a non-volatile memory 606 (e.g., hard disk) and the user interface (UI) 608 (e.g., a graphical user interface, a mouse, a keyboard, a display, touch screen and so forth). The non-volatile memory 606 stores computer instructions 612, an operating system 616 and data 618. In one example, the computer instructions 612 are executed by the processor 602 out of volatile memory 604 to perform all or part of the processes described herein (e.g., processes 300 and 400).

The processes described herein (e.g., processes 300 and 400) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 300 and 400 are not limited to the specific processing order of FIGS. 3 and 4. Rather, any of the processing blocks of FIGS. 3 and 4 may be re-ordered, combined or removed, performed in parallel or in serial, as necessary, to achieve the results set forth above.

The processing blocks (for example, in the processes 300 and 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
    migrating a first device on a first array to a second device on a second storage array, the migrating comprising:
        instructing a plurality of assets to scan the first array and the second array for the first device and the second device;
        reading a work buffer on the second array comprising reading a migration field in the work buffer indicating that the first device is being migrated to a second device;
        sending a request to the work buffer for chunks of the first device to copy to the second device;
        assigning each chunk of the first device to a corresponding one of the plurality of assets, wherein the work buffer comprises asset-chunk fields, wherein each asset-chunk field indicates one or more chunks and an asset assigned to the one or more chunks;
        at each of the plurality of assets, reading the one or more assigned chunks from the first device, copying the one or more assigned chunks to the second device, and notifying the work buffer that the copying of the one or more assigned chunks was successful, the work buffer comprising success fields to indicate whether the copy of the one or more chunks was successful, each success field corresponding to one asset chunk field;
        evaluating a performance of each of the plurality of assets; and
        assigning additional chunks to the plurality assets based on the performance of each of the plurality of assets.

2. The method of claim 1, wherein migrating the first device on the first array to the second device on the second storage array comprises migrating the first device on the first array to the second device on a second storage array being the same as the first storage array.

3. The method of claim 1, wherein migrating the first device on the first array to the second device on the second storage array further comprises:
  scanning the work buffer for a non-copied chunk;
  reading the non-copied chunk from the first device;
  writing the non-copied chunk to the second device; and
  notifying the work buffer that the copying of the non-copied chunk was successful.

4. The method of claim 1, wherein migrating the first device on the first array to the second device on the second storage array further comprises:
  recording, for each of the plurality of assets, a parameter associated with the asset based on copying of the one or more assigned chunks to the second device.

5. The method of claim 4, wherein recording a parameter for each asset based on copying of the one or more assigned chunks to the second device comprises recording, in the work buffer, an amount of time each asset takes to copy their respective one or more assigned chunks to the second storage device.

6. The method of claim 1, wherein instructing the asset comprises instructing asset comprising one of a host, a storage array, a virtual storage or a virtual host.

7. An apparatus, comprising:
  electronic hardware circuitry configured to migrate a first device on a first array to a second device on a second storage array, the circuitry configured to migrate the first device on the first array to the second device on the second storage array comprising circuitry configured to:
    instruct a plurality of assets to scan the first array and the second array for the first device and the second device;
    read a work buffer on the second array comprising circuitry to read a migration field in the work buffer indicating that the first device is being migrated to a second device;
    send a request to the work buffer for chunks of the first device to copy to the second device;
    assign each chunk of the first device to a corresponding one of the plurality of assets, wherein the work buffer comprises asset-chunk fields, wherein each asset-chunk field indicates one or more chunks and an asset assigned to the one or more chunks;
    at each of the plurality of assets, read the one or more assigned chunks from the first device, copying the one or more assigned chunks to the second device, and notifying the work buffer that the copying of the one or more assigned chunks was successful, the work buffer comprising success fields to indicate whether the copy of the one or more chunks was successful, each success field corresponding to one asset chunk field;
    evaluate a performance of each of the plurality of assets; and
    assign additional chunks to the plurality assets based on the performance of each of the plurality of assets.

8. The apparatus of claim 7, wherein the circuitry comprises at least one of a processor, a memory, a programmable logic device or a logic gate.

9. The apparatus of claim 7, wherein the second storage array is the same as the first storage array.

10. The apparatus of claim 7, wherein the circuitry configured to migrate the first device on the first array to the second device on the second storage array further comprises circuitry configured to:
  scan the work buffer for a non-copied chunk;
  read the non-copied chunk from the first device;
  write the non-copied chunk to the second device; and
  notify the work buffer that the copying of the non-copied chunk was successful.

11. The apparatus of claim 7, wherein the circuitry configured to migrate the first device on the first array to the second device on the second storage array further comprises circuitry configured to:
  record, for each of the plurality of assets, a parameter associated with the asset based on copying of the one or more assigned chunks to the second device.

12. The apparatus of claim 11, wherein the circuitry configured to record a parameter for each asset based on copying of the one or more assigned chunks to the second device comprises circuitry configured to record, in the work buffer, an amount of time each asset takes to copy their respective one or more assigned chunks to the second storage device.

13. The apparatus of claim 7, wherein the asset comprising one of a host, a storage array, a virtual storage or a virtual host.

14. An article comprising:
  a non-transitory computer-readable medium that stores computer-executable instructions to migrate a first device on a first array to a second device on a second storage array, the instructions causing a machine to:
    instruct a plurality of assets to scan the first array and the second array for the first device and the second device;
    read a work buffer on the second array comprising instructions causing the machine to read a migration field in the work buffer indicating that the first device is being migrated to a second device;
    send a request to the work buffer for chunks of the first device to copy to the second device;
    assign each chunk of the first device to a corresponding one of the plurality of assets, wherein the work buffer comprises asset-chunk fields, wherein each asset-chunk field indicates one or more chunks and an asset assigned to the one or more chunks;
    at each of the plurality of assets, read the one or more assigned chunks from the first device, copying the one or more assigned chunks to the second device, and notifying the work buffer that the copying of the one or more assigned chunks was successful, the work buffer comprising success fields to indicate whether the copy of the one or more chunks was successful, each success field corresponding to one asset chunk field;
    evaluate a performance of each of the plurality of assets; and
    assign additional chunks to the plurality assets based on the performance of each of the plurality of assets.

15. The article of claim 14, wherein the second storage array is the same as the first storage array.

16. The article of claim 14, wherein the instructions causing the machine to migrate the first device on the first array to the second device on the second storage array further comprises instructions causing the machine to:
  scan the work buffer for a non-copied chunk;
  read the non-copied chunk from the first device;
  write the non-copied chunk to the second device; and notify the work buffer that the copying of the non-copied chunk was successful.

17. The article of claim 14, wherein the instructions causing the machine to migrate the first device on the first array to the second device on the second storage array further comprises instructions causing the machine to:

record, for each of the plurality of assets, a parameter associated with the asset based on copying of the one or more assigned chunks to the second device.

18. The article of claim 17, wherein the instructions causing the machine to record a parameter for each asset based on copying of the one or more assigned chunks to the second device comprises instructions causing the machine to record, in the work buffer, an amount of time each asset takes to copy their respective one or more assigned chunks to the second storage device.

19. The article of claim 14, wherein the asset comprising one of a host, a storage array, a virtual storage or a virtual host.

20. The method of claim 1 wherein at least two of the plurality of assets comprise different hosts or virtual hosts.

* * * * *